US008466851B2

(12) United States Patent
Huitema et al.

(10) Patent No.: US 8,466,851 B2
(45) Date of Patent: Jun. 18, 2013

(54) SECONDARY DISPLAY INTEGRATION IN FLEXIBLE DISPLAY DEVICES

(75) Inventors: Hjalmar Edzer Ayco Huitema, Veldhoven (NL); Pieter J.G. van Lieshout, Beek en Donk (NL)

(73) Assignee: Creator Technology B.V., Breda (NL)

( * ) Notice: Subject to any disclaimer, the term of this patent is extended or adjusted under 35 U.S.C. 154(b) by 765 days.

(21) Appl. No.: 12/514,014

(22) PCT Filed: Nov. 8, 2007

(86) PCT No.: PCT/NL2007/050547
§ 371 (c)(1),
(2), (4) Date: Mar. 15, 2010

(87) PCT Pub. No.: WO2008/056982
PCT Pub. Date: May 15, 2008

(65) Prior Publication Data
US 2010/0171683 A1      Jul. 8, 2010

Related U.S. Application Data

(60) Provisional application No. 60/865,014, filed on Nov. 9, 2006.

(51) Int. Cl.
*G09G 5/00* (2006.01)
(52) U.S. Cl.
USPC .............................................. 345/1.3
(58) Field of Classification Search
USPC ............ 345/1.3, 107; 349/149, 150, 152; 361/679.04; 438/107; 313/3, 6, 511, 512; 715/764
See application file for complete search history.

(56) References Cited

U.S. PATENT DOCUMENTS

| 7,479,932 B2 * | 1/2009 | Tanaka et al. .................. 345/1.1 |
| 2003/0063041 A1 | 4/2003 | Kurashima et al. |

FOREIGN PATENT DOCUMENTS

| JP | 2004-93627 | 3/2004 |
| WO | WO 2006/085271 A2 | 8/2006 |
| WO | WO 2006085271 | 8/2006 |

OTHER PUBLICATIONS

International Search Report dated Feb. 15, 2008 for PCT/NL2007/050547.

* cited by examiner

*Primary Examiner* — Abbas Abdulselam (57) ABSTRACT

A flexible display device (50, 51) employs a discontinuous frontplane (60, 64) and a continuous backplane (70, 74). The discontinuous frontplane (60, 64) includes a primary frontplane region (61), a secondary frontplane region (63), and a spatial frontplane region (62) spatially separating the primary frontplane region (61) and the secondary frontplane region (63). The continuous backplane (70, 74) includes a primary backplane region (71), a secondary backplane region (73), and an interconnection backplane region (72) electrically interconnecting the primary backplane region (71) and the secondary backplane region (73). The primary frontplane region (61) and the primary backplane region (71) constitute a primary display (61, 71). The secondary frontplane region (63) and the secondary backplane region (73) constitute a secondary display (63, 73). The interconnection backplane region (72) defines the secondary display (63, 73) as an extension of the primary display (61, 71).

21 Claims, 14 Drawing Sheets

SECONDARY DISPLAY INTEGRATION IN FLEXIBLE DISPLAY DEVICES

FIELD OF THE INVENTION

The present invention generally relates to flexible displays. The present invention specifically relates to flexible display devices incorporating an integration of a secondary display with a primary display.

BACKGROUND

Figure 1:
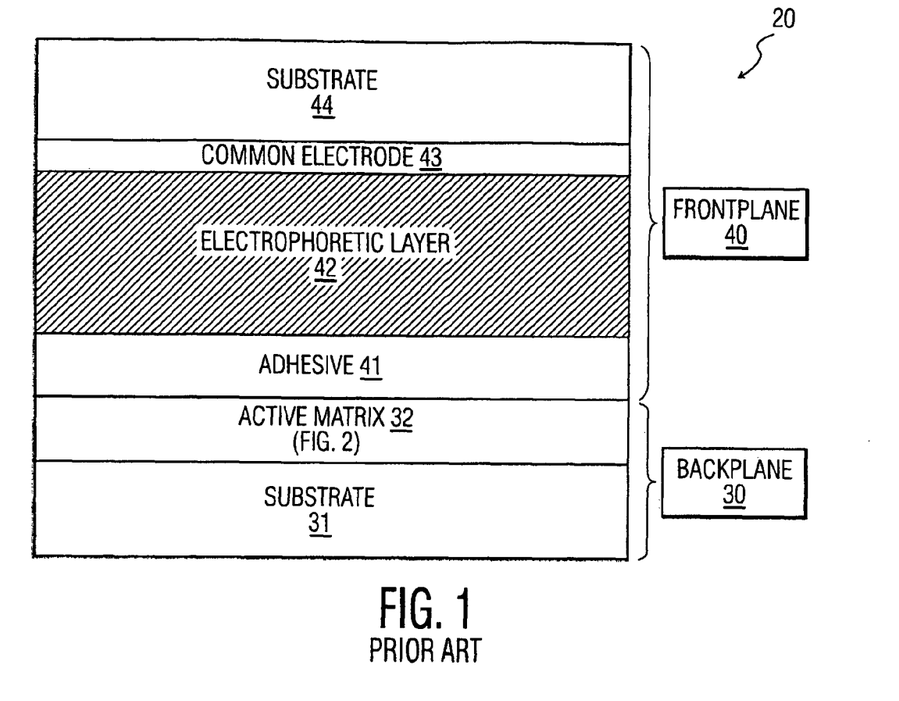
FIG. 1 illustrates a side view of a flexible display as known in the art.

FIG. 1 illustrates a flexible display 20 developed by Polymer Vision. Flexible display 20 has an active matrix backplane 30 consisting of a substrate 31 and an active matrix 32. Flexible display 20 further has an electrophoretic frontplane 40 comprising adhesive 41, an electrophoretic layer 42 (e.g. from a supplier such as E Ink or SiPix), a common electrode 43 and a substrate 44.

One use of flexible display 20 is in a wrap display system whereby flexible display 20 is wrapped around a stick (i.e., a body with a tubular configuration having a circular, elliptical, rectangular with rounded corners, square with rounded corners or any other curvilinear cross-section) for facilitating a storage of flexible display 20 and unwrapped from the stick for facilitating an operation of flexible display 20. Currently, such a wrapped display system excludes a preview screen when flexible display 20 is wrapped around the stick for storage protection purposes.

SUMMARY OF INVENTION

The present invention provides new and unique structural forms of a flexible display device employing a discontinuous frontplane and a continuous backplane. The discontinuous frontplane includes a primary frontplane region, a secondary frontplane region and a spatial frontplane region spatially separating the primary frontplane region and the secondary frontplane region. The continuous backplane includes a primary backplane region, a secondary backplane region and an interconnection region electrically interconnecting the primary backplane region and the secondary backplane region. The primary frontplane region and the primary backplane region constitute a primary display. The secondary frontplane region and the secondary backplane region constitute a secondary display. The interconnection region defines the secondary display as an extension of the primary display.

A wrapping of the flexible display device around a stick facilitates both a storage of the primary display and a viewing of the secondary display. An unwrapping of the flexible display device from around the stick facilitates an operation of the primary display.

BRIEF DESCRIPTION OF THE DRAWINGS

The foregoing forms as well as other features and advantages of the present invention will become further apparent from the following detailed description of various embodiments of the present invention, read in conjunction with the accompanying drawings. The detailed description and drawings are merely illustrative of the present invention rather than limiting, the scope of the present invention being defined by the appended claims and equivalents thereof.

DETAILED DESCRIPTION OF THE DRAWINGS

One inventive principle of the present invention is to structurally configure a flexible display device with a discontinuous frontplane and continuous backplane that provides secondary display as an extension of the primary display (e.g., the secondary display serves as preview screen for the primary display). For purposes of the present invention, the term "discontinuous frontplane" is broadly defined herein as any display frontplane having a spatial separation of two (2) or more regions of the display frontplane for purposes of providing viewing mediums of a primary display and a secondary display, and the term "continuous backplane" is broadly defined herein as any display backplane having an electrical interconnection of two (2) or more regions of the display backplane for mutually controlling, partially or entirely, the viewing mediums of a primary display and a secondary display.

The present invention does not impose any limitations or restrictions as to a material composition and structural configuration of a discontinuous frontplane and a continuous backplane of the present invention. In practice, specific implementations of a discontinuous frontplane and a continuous backplane of the present invention are dependent upon the commercial implementations of the present invention, and are therefore without limit. Thus, the following description of FIG. 3 provides an exemplary embodiment of a flexible display device incorporating the aforementioned inventive principle of the present invention.

Figure 3:
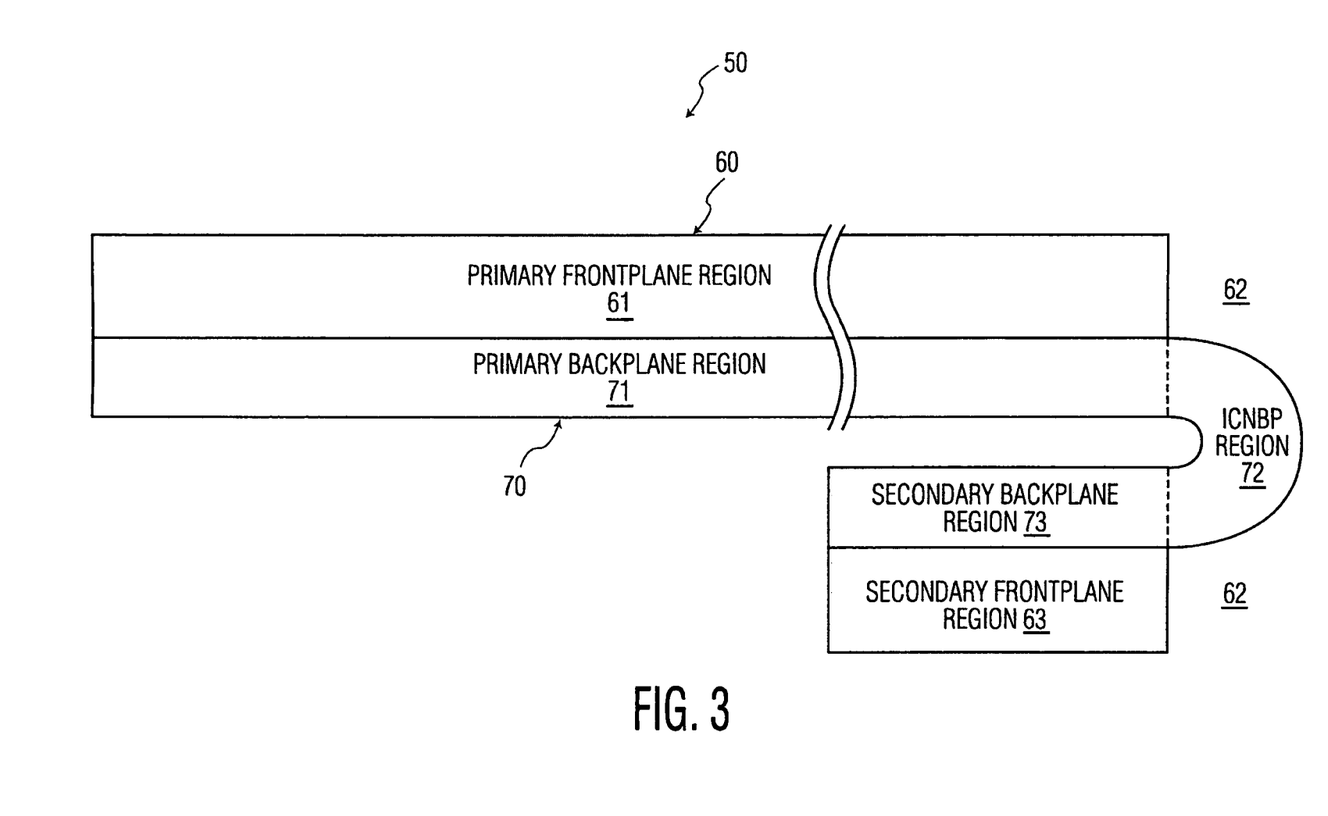
FIG. 3 illustrates a side view of a first embodiment of a flexible display device in accordance with the present invention.

FIG. 3 illustrates a flexible display device 50 employing a discontinuous frontplane 60 consisting of a primary frontplane region 61 and a secondary frontplane region 63 separated by a spatial frontplane region 62, and a continuous backplane 70 consisting of a primary backplane region 71 and a secondary backplane region 73 electrically interconnected by interconnection backplane ("ICNBP") region 72. As will be appreciated by those having ordinary skill in the art, a primary frontplane region 61 and a primary backplane region 71 constitute a primary display of an $X_P$ number of pixel rows and a $Y_P$ number of pixel columns, and a secondary frontplane region 63 and a secondary frontplane region 73 constitute a secondary display having an Xs number of pixel rows and a $Y_S$ number of pixels columns, where $X_P \geqq X_S$ and/or $Y_P \geqq Y_S$.

ICNBP region 72 electrically connects backplanes regions 71 and 73 for a mutual control, partially or entirely, of the primary display and the secondary display to thereby define the secondary display as an extension of the primary display. To further an understanding of ICNBP region 72, an exemplary description of ICNBP region 72 will now be described herein in the context of an active matrix-addressing scheme.

Figure 2:
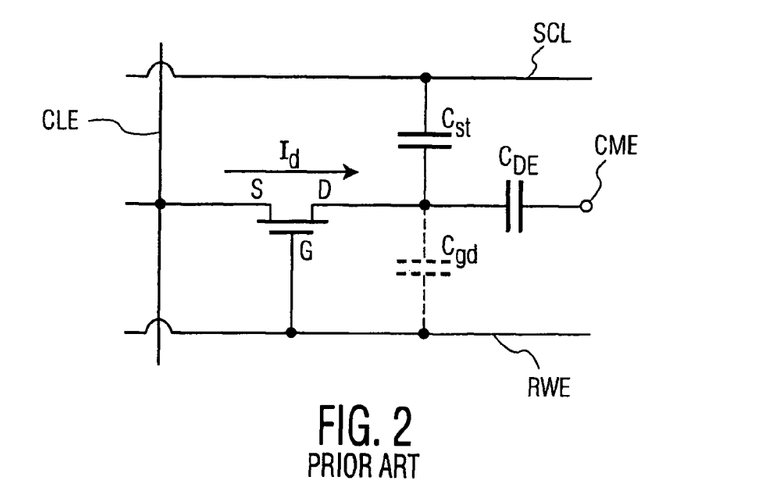
FIG. 2 illustrates a schematic view of an active-matrix pixel as known in the art.

Specifically, FIG. 2 illustrates an equivalent circuit of a pixel for an active-matrix display. The circuit as shown has a source S of a thin film transistor that is electrically connected to a column electrode CLE, a gate G of the thin film transistor is electrically connected to a row electrode RWE, and a drain D of the thin film transistor is electrically connected to a storage capacitor $C_{st}$ further electrically connected to a storage capacitor line SCL, a base capacitor $C_{DE}$ further electrically connected to a common electrode CME and a parasitic capacitor $C_{gd}$ established between gate G and drain D of the thin film transistor. A selection time of frame of the pixel involves an application of a selection voltage of row electrode RWE and column electrode CLE that transitions the thin film transistor from a non-conducting state to a conducting state whereby the capacitors are charged to a display voltage applied to column electrode CLE. The capacitors retain the charge upon the thin film transistor transitioning back to a non-conducting state during a subsequent hold time of the frame.

Figure 4:
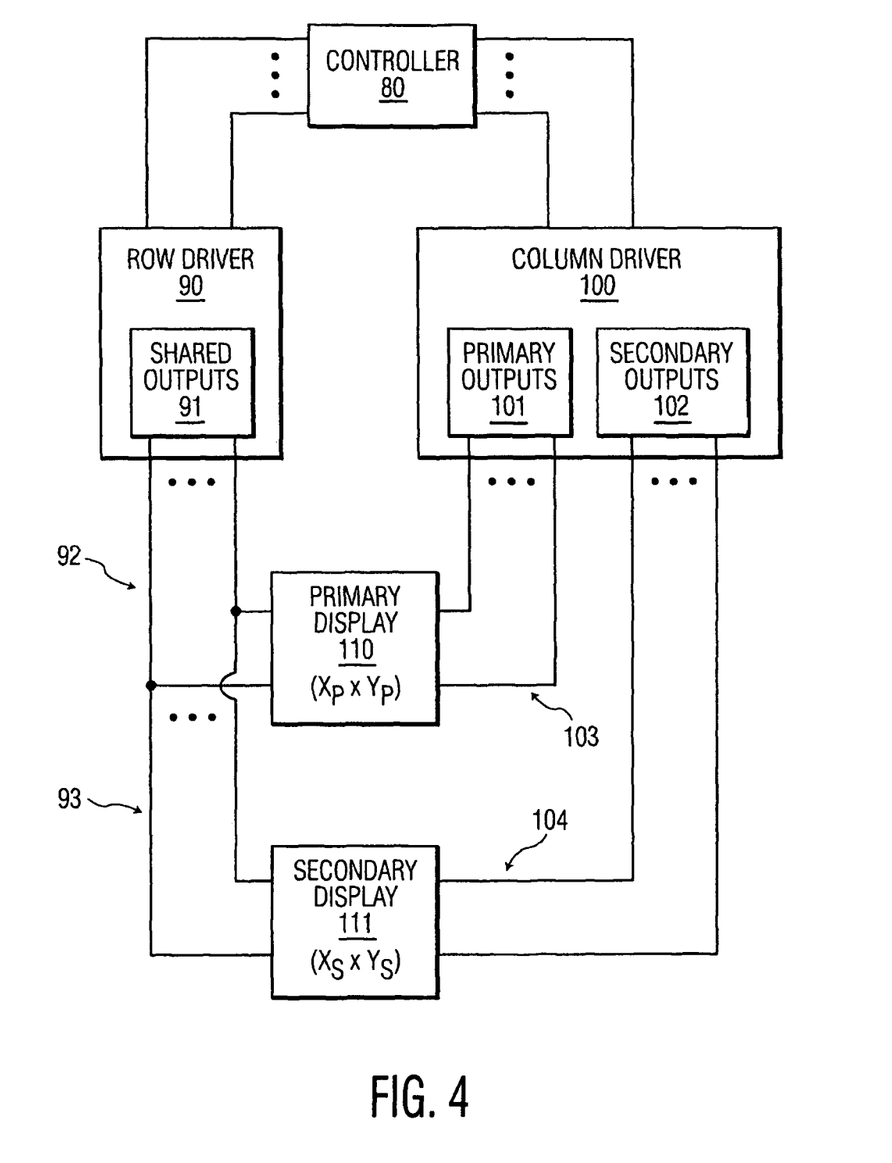
FIGS. 4 and 5 illustrate exemplary electrode interconnection schemes in accordance with the present invention.

Referring additionally to FIG. 3, ICNBP region 72 is used in this case to facilitate the primary display and the second display sharing, partially or entirely, row electrodes RWE and/or column electrodes CLE as well as any other electrodes or the like including, but not limited to, a common electrode of the discontinuous frontplane, power lines and clock lines. For example, as illustrated in FIG. 4, a controller 80 controls a row driver 90 and a column driver 100 in driving pixels of a primary display 110 via row electrodes 92 connecting pixels of primary display 110 to outputs 91 of row driver 90 and via column electrodes connecting the pixels of primary display 110 to primary outputs 101 of column driver 100. ICNBP region 72 (not shown) supports row electrodes 93 as an extension of row electrodes 92 whereby pixels of a secondary display 111 are connected to outputs 91 to be mutually driven by row driver 90. Conversely, ICNBP region 72 further supports column electrodes 104 that are distinct from column electrodes 103 whereby the pixels of secondary display 111 are connected to outputs 102 of column driver 100 to be distinctly driven by column driver 100.

Figure 5:
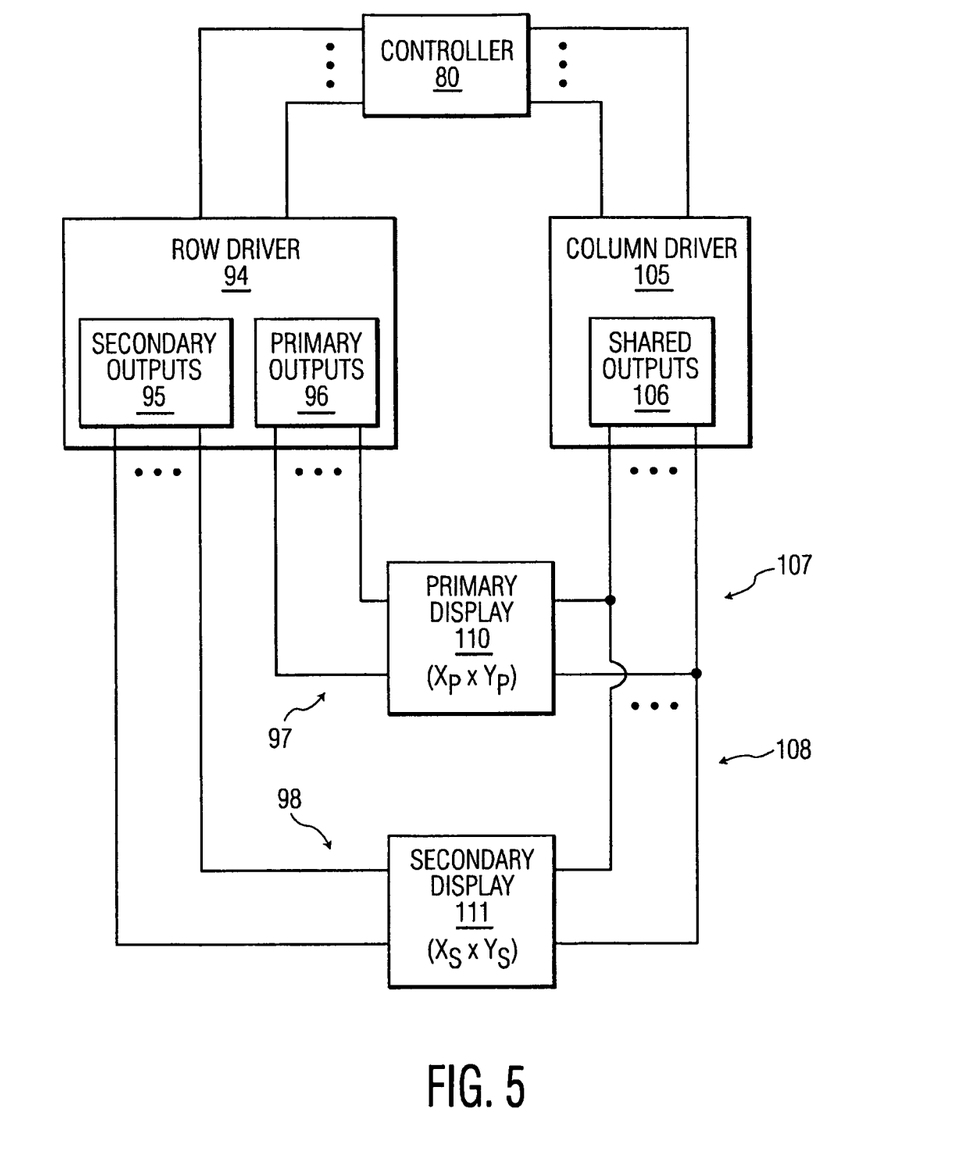

By contrast, as illustrated in FIG. 5, controller 80 controls a row driver 94 and a column driver 105 in driving the pixels of primary display 110 via row electrodes 97 connecting the pixels of primary display 110 to outputs 96 of row driver 94 and via column electrodes 107 connecting the pixels of primary display 110 to outputs 106 of column driver 105. ICNBP region 72 (not shown) supports column electrodes 108 as an extension of column electrodes 107 whereby pixels of secondary display 111 are connected to outputs 106 to be mutually driven by column driver 105. Conversely, ICNBP region 72 further contains row electrodes 98 that are distinct from row electrodes 97 whereby the pixels of secondary display 111 are connected to outputs 95 of row driver 94 to be distinctly driven by row driver 94.

In practice, an $X_E$ number of row electrodes and a $Y_E$ number of column electrodes can be shared between a primary display and a secondary display via an ICNBP region of the present invention, where $X_E \geqq 0$ and $Y_E \geqq 0$. Concurrently or alternatively, ICNBP region 72 can support other electrical interconnections, such as, for example, power lines and clock lines. Thus, the degree to which row electrodes and column electrodes as well as other electrical interconnections are shared by the primary display and the secondary display is determinative to the degree to which the drivers, the controller and any other integrated circuit component are also shared by the primary display and the secondary display.

In practice, an actual $X_E$ number of row electrodes and an actual $Y_E$ number of column electrodes shared between a primary display and a secondary display via an ICNBP region of the present invention is dependent upon an intended use of a flexible display device and is therefore without limit. In one exemplary embodiment, the secondary display serves as a preview screen of the primary display whereby a subset of the row electrodes and a subset of the column electrodes are shared between the primary display and the secondary display. This enables the secondary screen to show a selected portion of the primary display as controlled by a shared controller. In another exemplary embodiment, the secondary display serves as it own content display based some or all of the row electrodes being shared between the primary display and the secondary display, or some or all of the column electrodes being shared between the primary display and the secondary display. In yet another exemplary embodiment, the second display serves as an exact copy of the primary display whereby all row electrodes and column electrodes are shared between the primary display and the secondary display. This enables a construction of a display device with a 360° viewing angle.

Referring again to FIG. 3, the flexible nature of ICNBP region 72 facilitates a bending of ICNBP region 72 whereby the primary display and the secondary display are located on different sides of flexible display device 50, such as, for example, opposing sides of flexible display device 50 as shown in FIG. 3. In practice, the degree to which ICNBP region 72 is or is not bent is dependent upon the intended use of the flexible display device and is therefore without limit.

A description of three (3) exemplary embodiments of flexible display device 50 will now be provided herein to further an understanding of the present invention.

Figure 6:
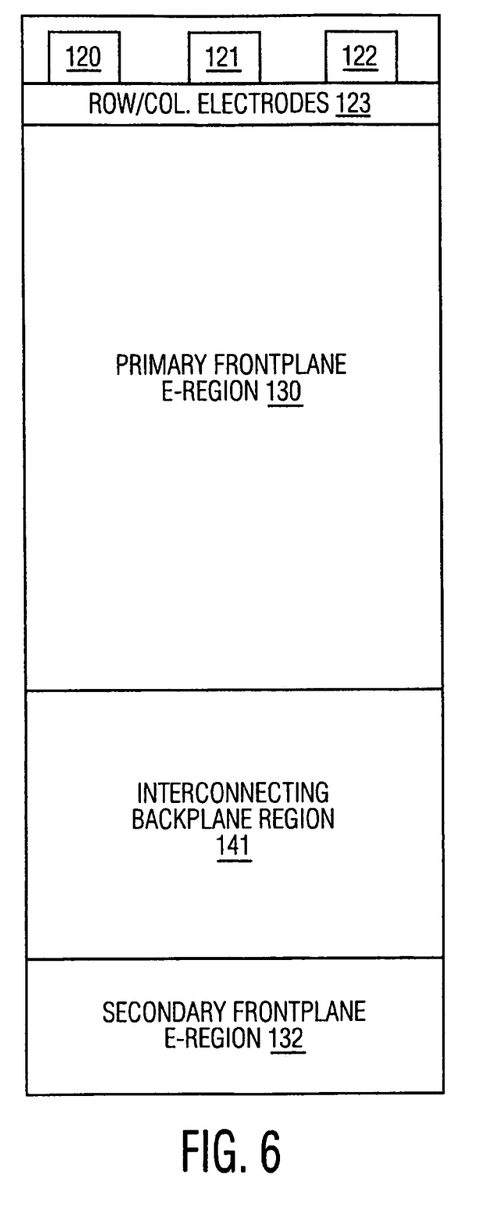
FIGS. 6 and 7 illustrate a top view and a side view, respectively, of a first exemplary embodiment of the flexible display device illustrated in FIG. 3 in accordance with the present invention.
Figure 7:
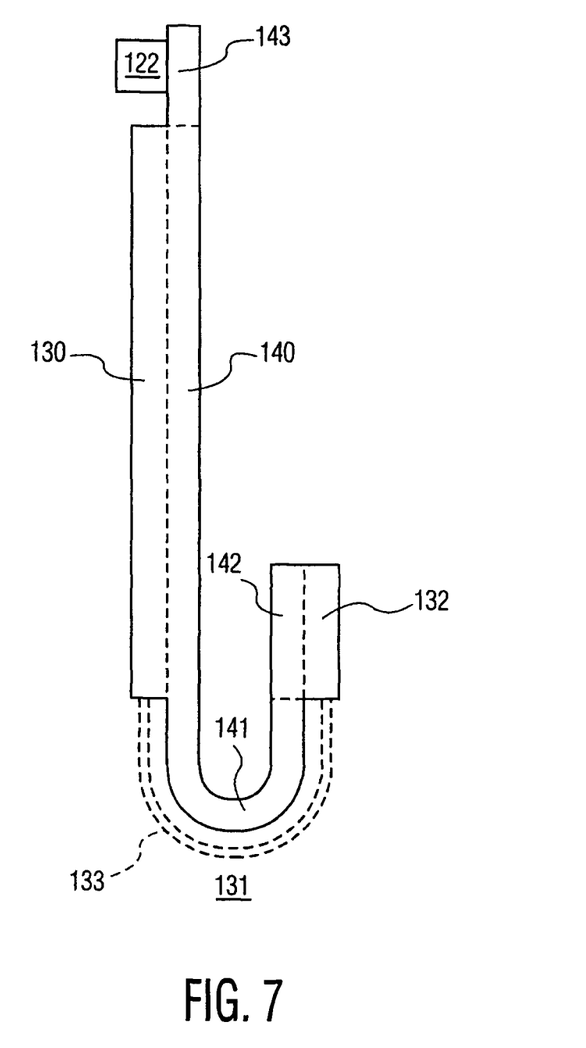

FIGS. 6 and 7 illustrate a first exemplary embodiment having primary frontplane electrophoretic region ("E-region") 130 and a primary active matrix backplane region 140 constituting a primary display, and a secondary frontplane E-region 132 and a secondary active matrix backplane 142 constituting a secondary display. A controller 120, a row driver 121 and a column driver 122 are located on a integrated circuit backplane portion 143 supporting row/column electrodes whereby interconnecting backplane region 141 supports each shared row/column electrodes for electrically interconnecting the secondary display to the primary display as well as any unshared row/column electrodes.

Optionally, the primary display and the secondary display can share a common electrode 133 extending across a spatial frontplane region 131 as shown in FIG. 7. Alternatively, a common electrode can extend across the backplane with connection to both the primary display and the secondary display.

Alternatively, the width of the interconnecting backplane region 141 and the secondary frontplane region 132 differs from primary frontplane region 130, e.g. the width of region 141 and 132 is smaller than the width of region 130.

Figure 8:
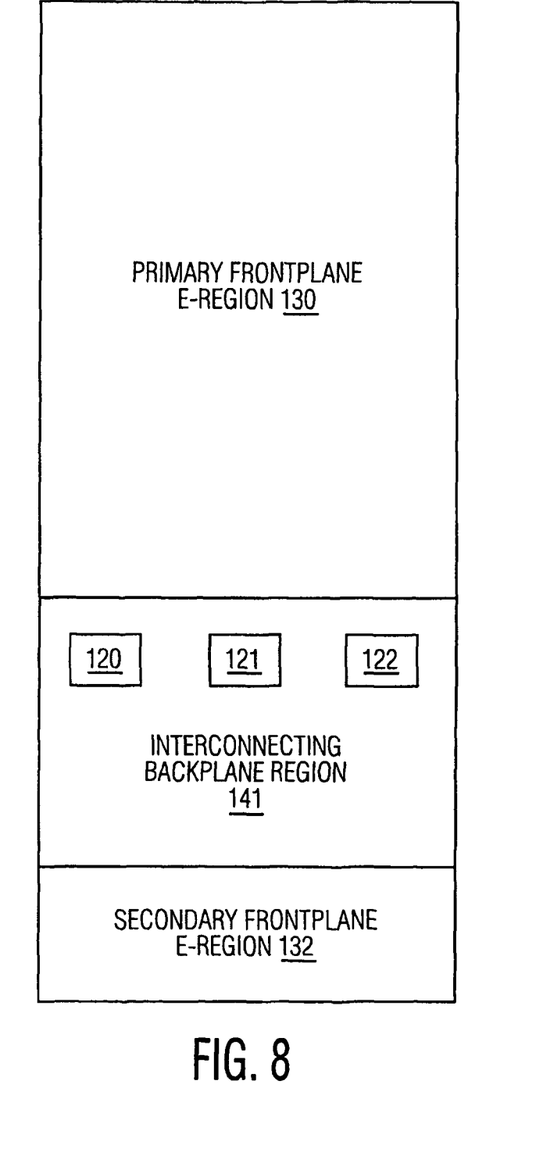
FIGS. 8 and 9 illustrate a top view and a side view, respectively, of a second exemplary embodiment of the flexible display device illustrated in FIG. 3 in accordance with the present invention.
Figure 9:
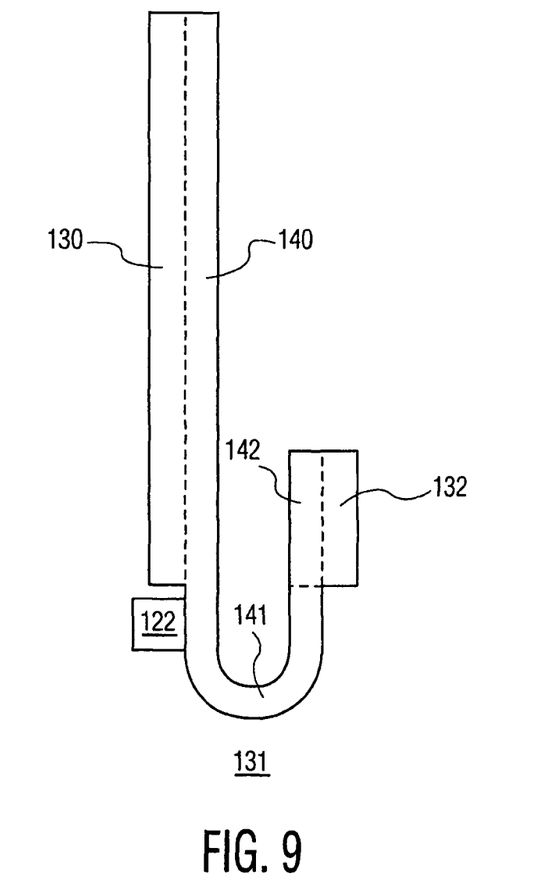

FIGS. 8 and 9 illustrate a second exemplary embodiment having primary frontplane having a controller 120, a row driver 121 and a column driver 122 located on interconnecting backplane region 141. For this embodiment, integrated circuit backplane region 143 has been combined with interconnecting backplane region 141.

Figure 10:
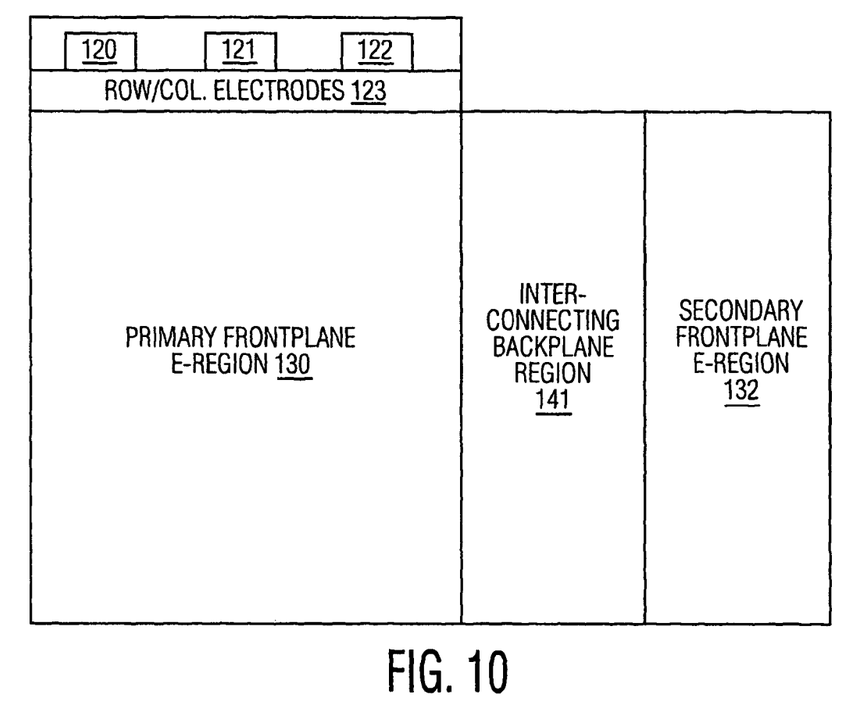
FIGS. 10 and 11 illustrate a top view and a side view, respectively, of a third exemplary embodiment of the flexible display device illustrated in FIG. 3 in accordance with the present invention.
Figure 11:
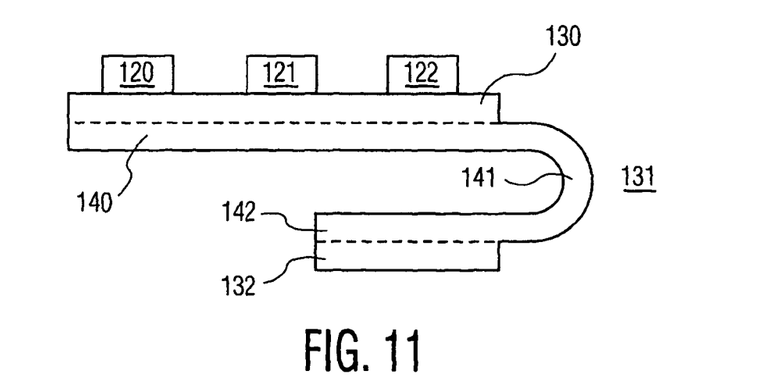

FIGS. 10 and 11 illustrate a third exemplary embodiment where the length of the primary display has been decreased and the width of the primary display has been increased. As such, it is more beneficial to extend the secondary display on a different side of the primary display as shown.

Figure 12:
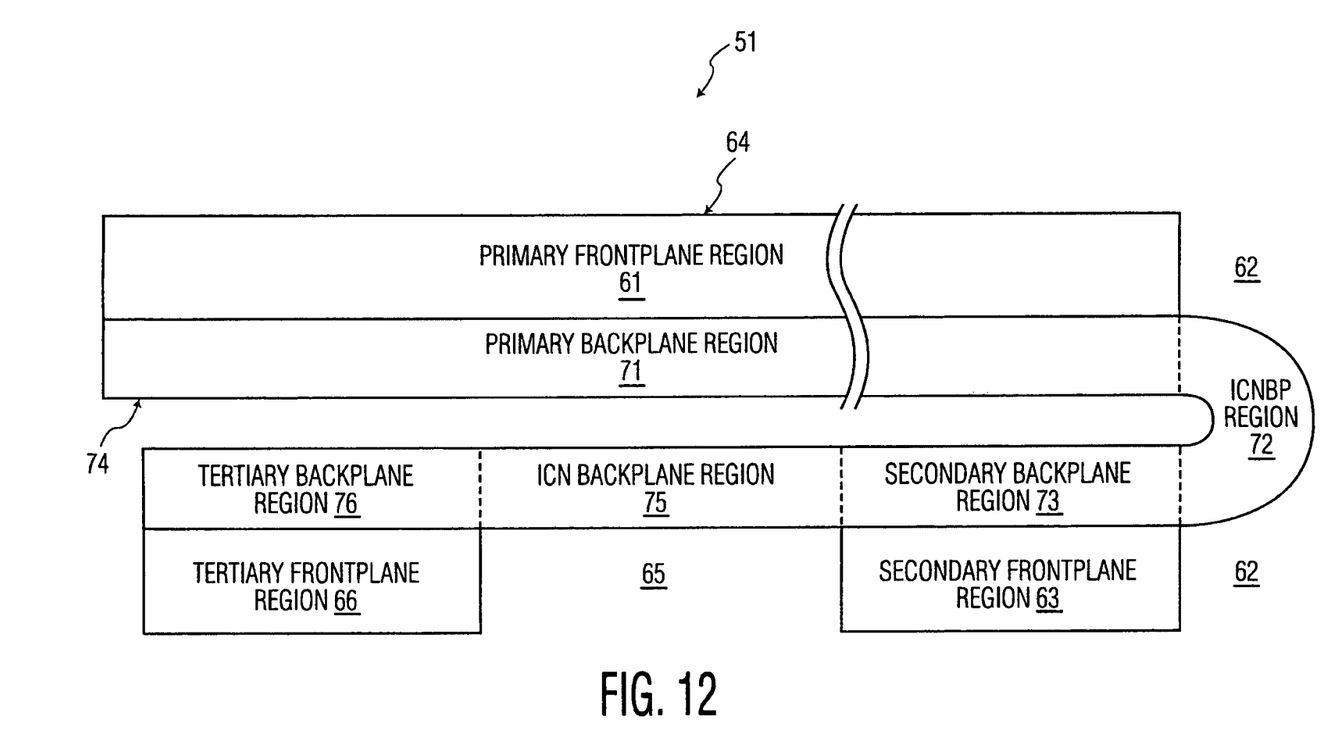
FIG. 12 illustrates a side view of a second embodiment of a flexible display device in accordance with the present invention.

A second inventive principle of the present invention is to structurally configure a flexible display device with a discontinuous frontplane and continuous backplane that provides a tertiary display as an additional extension of the primary display. In practice, the tertiary display can be directly extended from the primary display as taught in FIG. 3 for the secondary display, or indirectly extended from the primary display as shown in FIG. 12.

Figure 13:
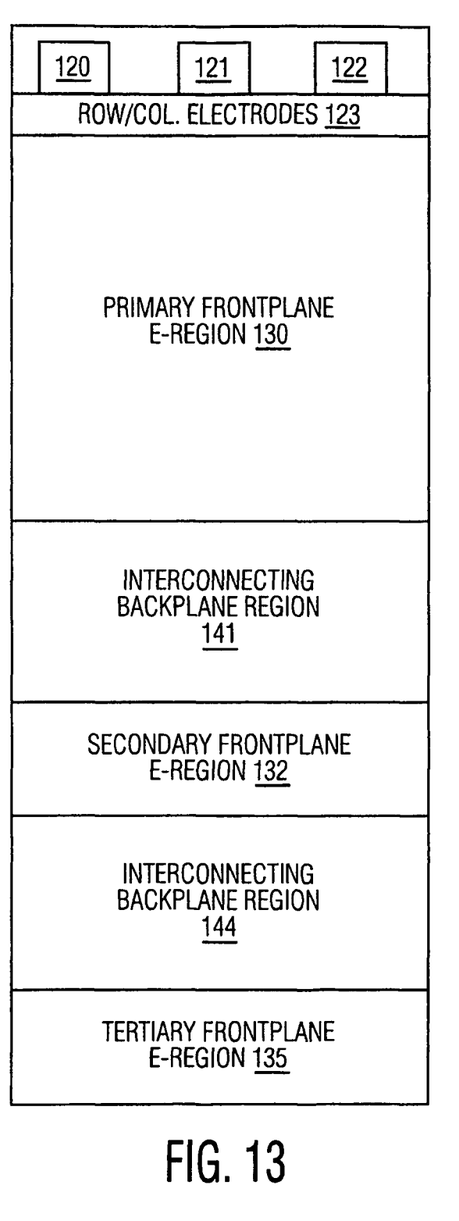
FIGS. 13 and 14 illustrate a top view and a side view, respectively, of an exemplary embodiment of the flexible display device illustrated in FIG. 12 in accordance with the present invention.
Figure 14:
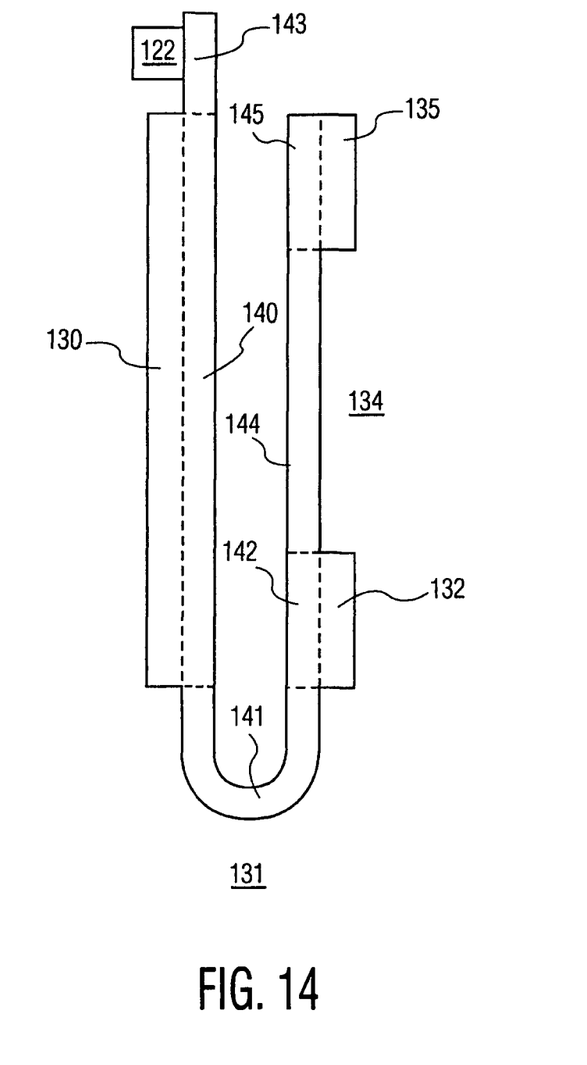
Figure 15:
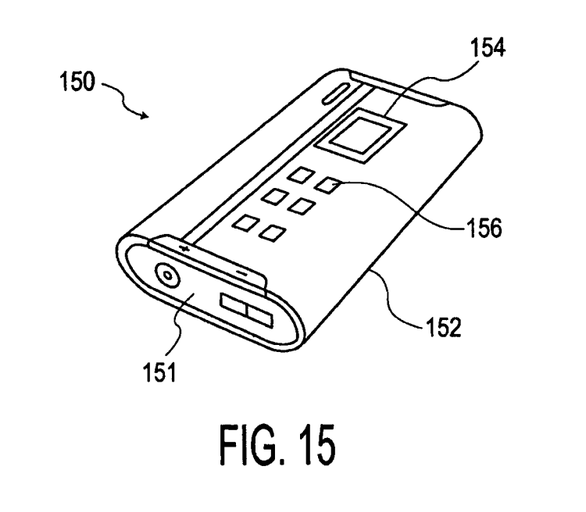
FIGS. 15 and 16 illustrate perspective views of one embodiment of a wrap display device in accordance with the present invention.

Specifically, a flexible display device 51 has discontinuous frontplane 64 further consisting of a tertiary frontplane region 66 separated from secondary frontplane region 63 by a spatial frontplane region 65, and continuous backplane 74 further consisting of a tertiary backplane region 76 electrically connected to secondary backplane region 73 by an interconnecting backplane region 75. An exemplary embodiment of flexible display, device 51 is shown in FIGS. 13 and 14 as an variation of the flexible display device shown in FIGS. 6 and 7. In this variation, a tertiary frontplane region 135 is spatially separated from secondary frontplane region 132, and tertiary frontplane region 135 and a tertiary backplane region 145 constitute a tertiary display that is a further extension of the primary display via an interconnection backplane region 144.

A third inventive principle of the present invention is to structurally configure a flexible display device with a discontinuous frontplane and continuous backplane that provides additional displays as further extensions of the primary displays.

A fourth inventive principles of the present invention is to structurally configure a flexible display device with a discontinuous frontplane and continuous backplane that provides the primary display as a standalone display and two or more additional displays sharing row electrodes and/or column electrodes as well as any other electrodes or the like including, but not limited to, a common electrode, power lines and clock lines.

Figure 16:
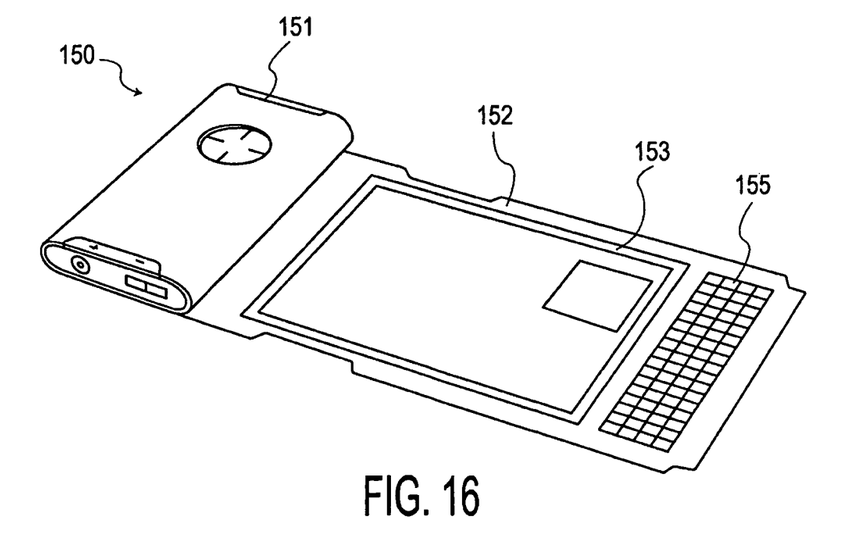
Figure 17:
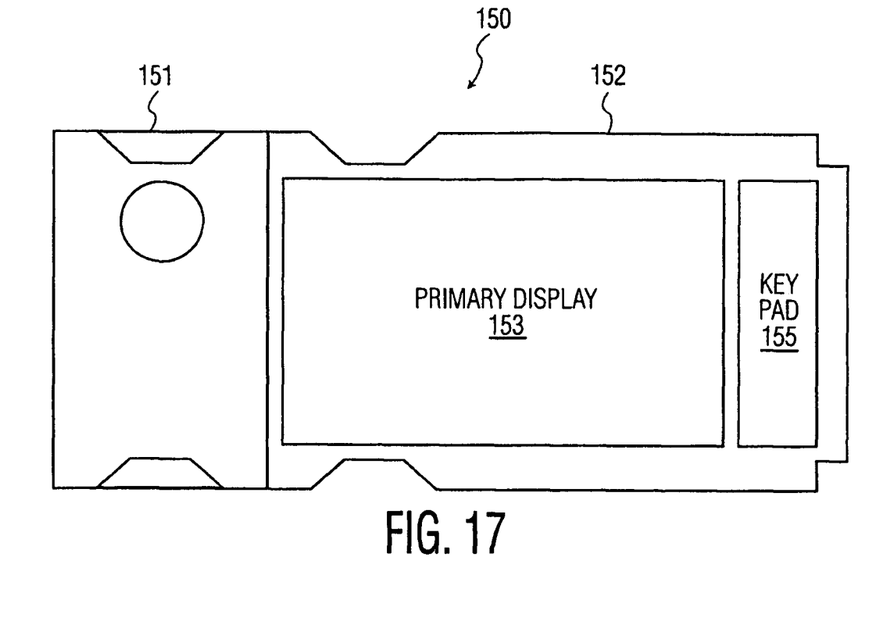
FIGS. 17 and 18 illustrate side views of the a wrap display device illustrated in FIGS. 15 and 16 in accordance with the present invention.
Figure 18:
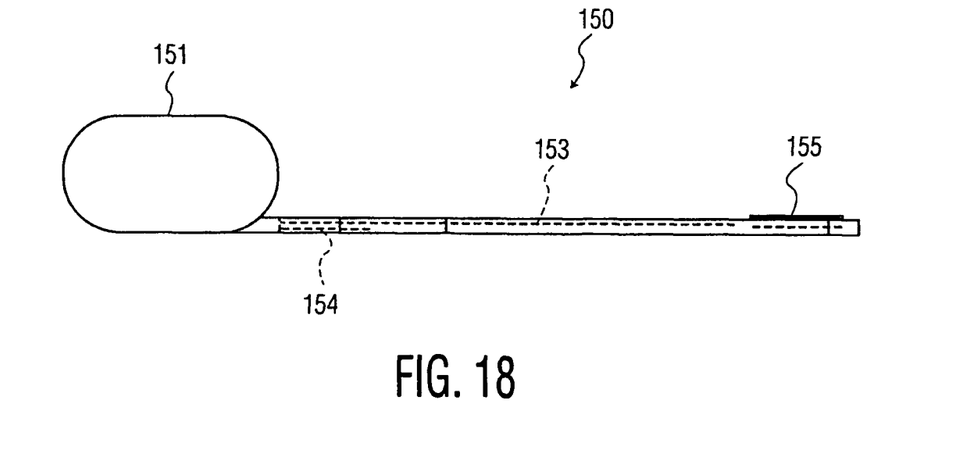

In practice, a flexible display device of the present invention can be incorporated in any type of device or apparatus including, but not limited to, mobile phones, personal data assistants and the like. FIGS. 15-18 illustrate a wrap display system 150 having a stick 151 and a flexible display foil 152. A flexible display device of the present invention is enclosed within flexible display foil 152 as best shown in FIG. 18 whereby a wrapping of foil 152 around stick 151 facilitates a storage of primary display 153 and a viewing of secondary display 154 and an unwrapping of foil 152 from around stick 151 facilitates an operation of primary display 153 via a key pad 155 as best shown in FIG. 16. Keys 156 are provided on the foil 152 facilitating control of operation of the device, preferably in conjunction with the secondary display 154, in the wrapped position.

Alternatively, secondary display 154 can also be positioned elsewhere within foil 152, such as, for example, on the opposite end of foil 152 adjacent key pad 155. Furthermore, secondary display 154 can share some or all of the electrical connections of primary display 153 to key pad 155, or alternatively, secondary display 154 can have individual connections to key pad 155 or any other input mechanism (not shown).

Referring to FIGS. 2-18, those having ordinary skill in the art will appreciate numerous advantages and benefits of the present invention including, but not limited to, a low cost flexible display device integrating one or more additional displays as extension(s) of a primary display with a minor additional thickness and/or width to the flexible display device. Those having ordinary skill in the art will further appreciate how to apply the inventive principles of the present invention as applied to a primary display and one or more additional displays as extension of the primary display for frontplanes of any type (e.g., electrophoretic frontplane as shown in FIG. 1), for backplanes of any type (e.g., an active matrix backplane as shown in FIG. 1), and for incorporation within devices and apparatuses of any type (e.g. a wrapped display device).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A flexible display device, comprising:
   a discontinuous frontplane including:
      a primary frontplane region;
      a secondary frontplane region; and
      a spatial frontplane region spatially separating the primary frontplane region and the secondary frontplane region; and
   a continuous backplane including:
      a primary backplane region, wherein the primary frontplane region and the primary backplane region constitute a primary display;
      a secondary backplane region, wherein the secondary frontplane region and the secondary backplane region constitute a secondary display; and
      an interconnection backplane region electrically interconnecting the primary backplane region and the secondary backplane region to define the secondary display as an extension of the primary display.

2. The flexible display device of claim 1,
   wherein the discontinuous frontplane is an electrophoretic frontplane; and
   wherein the continuous backplane is an active matrix backplane.

3. The flexible display device of claim 1, wherein the interconnection backplane region is bent to position the primary display and the secondary display on different sides of the flexible display device.

4. The flexible display device of claim 1, wherein the discontinuous frontplane further includes:
   a common electrode shared by the primary display and the secondary display.

5. The flexible display device of claim 1, wherein the interconnection backplane region includes at least one row electrode shared between the primary display and the secondary display.

6. The flexible display device of claim 5, wherein the primary display and the secondary display have an equal number of rows.

7. The flexible display device of claim 5, wherein the secondary display has a lower number of rows than the primary display.

8. The flexible display device of claim 5, further comprising:
a row driver including at least one output shared between the primary display and the secondary display.

9. The flexible display device of claim 5, wherein the interconnection backplane region includes at least one column electrode shared between the primary display and the secondary display.

10. The flexible display device of claim 9, wherein the primary display and the secondary display have an equal number of columns.

11. The flexible display device of claim 9, wherein the secondary display has a lower number of columns than the primary display.

12. The flexible display device of claim 9, further comprising:
a column driver including at least one output shared between the primary display and the secondary display.

13. The flexible display device of claim 1, wherein the interconnection backplane region includes at least one column electrode shared between the primary display and the secondary display.

14. The flexible display device of claim 13, wherein the primary display and the secondary display have an equal number of columns.

15. The flexible display device of claim 13, wherein the secondary display has a lower number of columns than the primary display.

16. The flexible display device of claim 13, further comprising:
a column driver including at least one output shared between the primary display and the secondary display.

17. The flexible display device of claim 1, further comprising:
a controller operable to control at least one row of the primary display inclusive of at least one row of the secondary display.

18. The flexible display device of claim 1, further comprising:
a controller operable to control at least one column of the primary display inclusive of at least one column of the secondary display.

19. The flexible display device of claim 1, wherein the discontinuous frontplane further includes:
a tertiary frontplane region; and
an additional spatial frontplane region spatially separating the secondary frontplane region and the tertiary frontplane region; and
wherein the continuous backplane region further includes:
a tertiary backplane region, wherein the tertiary frontplane region and the tertiary backplane region constitute a tertiary display; and
an additional interconnection backplane region electrically interconnecting the secondary backplane region and the tertiary backplane region to define the tertiary display as an additional extension of the primary display.

20. A wrap display device, comprising:
a flexible display device including:
a discontinuous frontplane including:
a primary frontplane region;
a secondary frontplane region; and
a spatial frontplane region spatially separating the primary frontplane region and the secondary frontplane region; and
a continuous backplane including:
a primary backplane region, wherein the primary frontplane region and the primary backplane region constitute a primary display;
a secondary backplane region, wherein the secondary frontplane region and the secondary backplane region constitute a secondary display; and
an interconnection backplane region electrically interconnecting the primary backplane region and the secondary backplane region to define the secondary display as an extension of the primary display; and
a stick, wherein the flexible display device is structurally configured to be wrapped around the stick for facilitating both a storage of the primary display and a viewing of the secondary display and to be unwrapped from around the stick for facilitating an operation of the primary display.

21. The wrap display device of claim 20, wherein the secondary frontplane region comprises keys facilitating control of operation of the device in the wrapped position.

* * * * *